United States Patent
Ogushi

(10) Patent No.: US 8,929,764 B2
(45) Date of Patent: Jan. 6, 2015

(54) PRINTING APPARATUS AND CONTROL METHOD THEREOF

(75) Inventor: Takuhiro Ogushi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 13/311,527

(22) Filed: Dec. 5, 2011

(65) Prior Publication Data

US 2012/0155945 A1    Jun. 21, 2012

(30) Foreign Application Priority Data

Dec. 20, 2010 (JP) ................................. 2010-283725

(51) Int. Cl.
G03G 21/00        (2006.01)
B41J 29/38        (2006.01)
G06F 3/12         (2006.01)

(52) U.S. Cl.
CPC ............... *B41J 29/38* (2013.01); *G06F 3/1203* (2013.01); *G06F 3/1221* (2013.01); *G06F 3/1229* (2013.01); *G06F 3/1273* (2013.01); *G06F 3/1279* (2013.01); *Y02B 60/1271* (2013.01)
USPC .............................................. 399/79; 400/76

(58) Field of Classification Search
CPC .......... G03G 15/00; G03G 21/00; B41J 29/38
USPC ........................................ 399/79, 80; 400/76
See application file for complete search history.

(56) References Cited

U.S. PATENT DOCUMENTS

| 4,774,544 | A | * | 9/1988 | Tsuchiya et al. | ................. | 399/24 |
| 6,052,547 | A | * | 4/2000 | Cuzzo et al. | ..................... | 399/79 |
| 6,367,992 | B1 | * | 4/2002 | Aruga et al. | ..................... | 400/76 |
| 7,339,689 | B2 | * | 3/2008 | Hiraoka | ........................ | 358/1.15 |
| 8,027,609 | B2 | * | 9/2011 | Van Buren et al. | ............. | 399/79 |
| 8,295,720 | B2 | * | 10/2012 | Shiori | .............................. | 399/43 |
| 2002/0098027 | A1 | * | 7/2002 | Koike et al. | ..................... | 400/62 |

(Continued)

FOREIGN PATENT DOCUMENTS

DE    10337837 A1    3/2005
JP    8-324071 A    12/1996

(Continued)

OTHER PUBLICATIONS

U.S. Appl. No. 13/305,544, filed Nov. 28, 2011. Applicant: Takuhiro Ogushi.

(Continued)

*Primary Examiner* — Nguyen Ha
(74) *Attorney, Agent, or Firm* — Fitzpatrick, Cella, Harper & Scinto

(57) ABSTRACT

A printing apparatus prints on a printing medium based on print data from at least one host apparatus; stores print information associated with a printing operation except for print data in a first storage unit; performs, by a power supply unit, first control to supply power to the first storage unit and second control to stop power supply to the first storage unit; stores, in a second storage unit which receives power supply from the power supply unit regardless of the first control or the second control, the print information stored in the first storage unit when the printing apparatus changes from the first control to the second control; and when the printing apparatus receives a request from the host apparatus to obtain the print information after changing to the second control, transmits the print information stored in the second storage unit to the host apparatus.

11 Claims, 12 Drawing Sheets

(56) References Cited

U.S. PATENT DOCUMENTS

| | | |
|---|---|---|
| 2005/0044498 A1 | 2/2005 | Stoderschnig et al. |
| 2005/0154782 A1* | 7/2005 | Yoshida .................... 709/206 |
| 2007/0183107 A1 | 8/2007 | Okada et al. |
| 2010/0238507 A1* | 9/2010 | Matsushima et al. ........ 358/1.16 |
| 2010/0265530 A1* | 10/2010 | Takechi .................... 358/1.14 |
| 2011/0122436 A1 | 5/2011 | Ogushi |
| 2011/0218892 A1* | 9/2011 | Jeong et al. .................... 705/30 |

FOREIGN PATENT DOCUMENTS

| | | | |
|---|---|---|---|
| JP | 2007220024 A * | 8/2007 | ............... B41J 29/38 |
| JP | 2008-23780 A | 2/2008 | |
| JP | 2010-167621 A | 8/2010 | |
| KR | 10-2004-0100540 A | 12/2004 | |

OTHER PUBLICATIONS

German Office Action dated Oct. 15, 2012 issued in corresponding German Patent Application No. 102011121637.9.

Korean Office Action dated Nov. 1, 2013 issued in corresponding Korean Patent Application No. 10-2011-0137011.

Japanese Office Action dated Aug. 29, 2014 issued in corresponding Japanese Patent Application No. 2010-283725.

* cited by examiner

F I G. 1
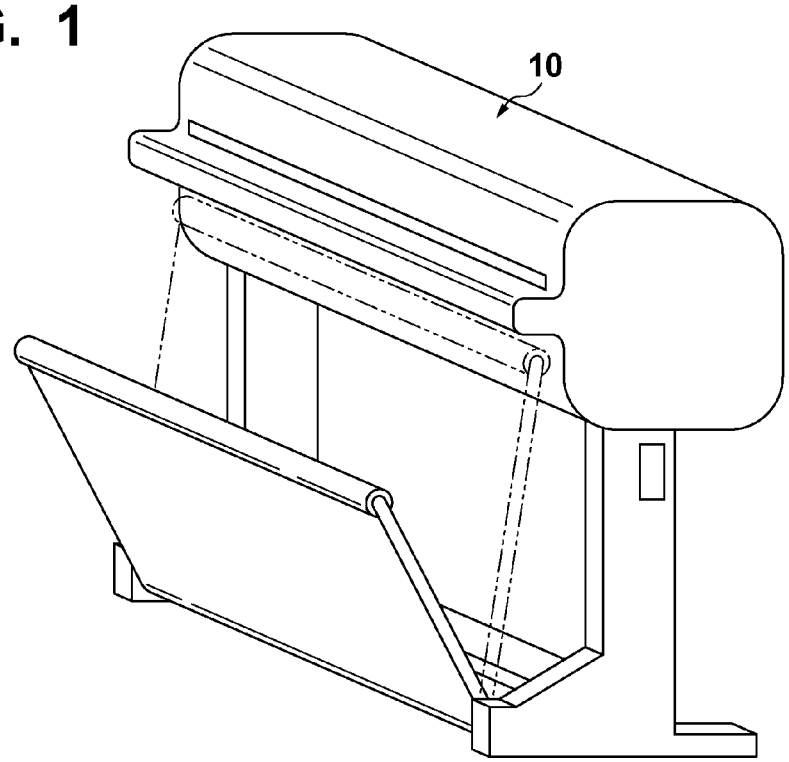
F I G. 2
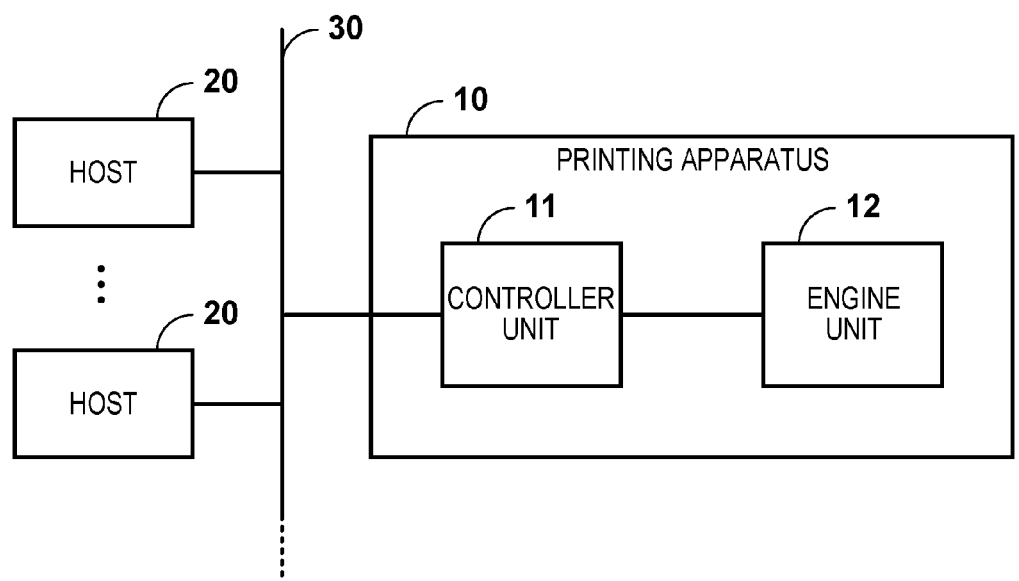

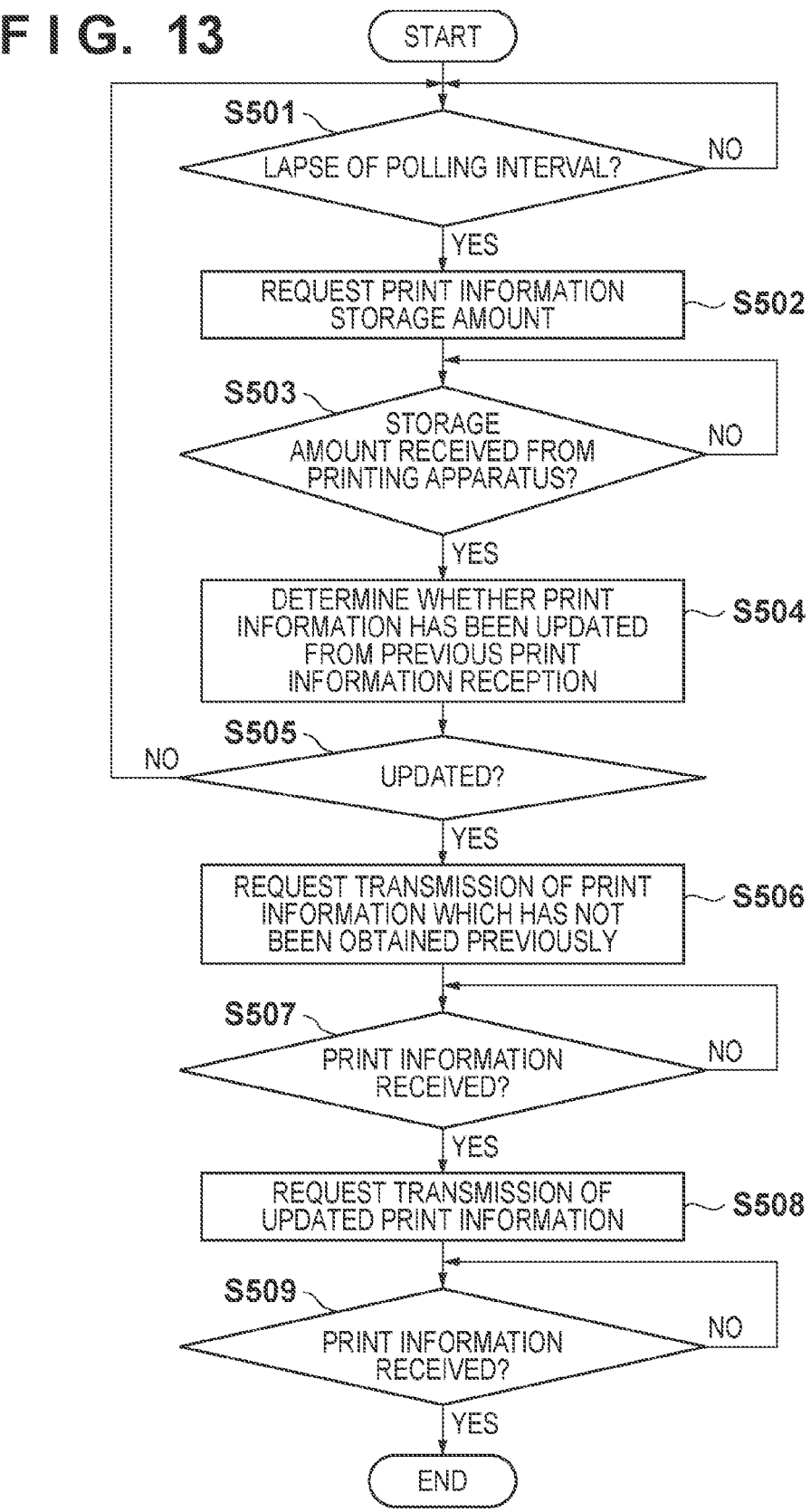

PRINTING APPARATUS AND CONTROL METHOD THEREOF

BACKGROUND OF THE INVENTION

1. Field of the Invention

The present invention relates to a printing apparatus and control method thereof.

2. Description of the Related Art

Along with the recent spread of networks in offices and the like, even printing apparatuses (for example, printer and copying machine) have a network connection function. In general, printing apparatuses, user terminals, and the like are connected to a network, and the printing apparatus is shared and used between users, departments, and the like. Printing apparatuses are arranged in accordance with the printing load, and the printing operation cost is calculated for each user and each department. There is a demand for an environment where the printing history can be managed in detail.

The printing apparatus needs to reduce its power consumption. To do this, the printing apparatus shifts to a low power consumption mode (to be referred to as a sleep state) unless it receives data from a host apparatus (for example, PC (Personal Computer)) for a predetermined time. Immediately when the printing apparatus receives data in the sleep state, it shifts to a printable state (to be referred to as a standby state).

Japanese Patent Laid-Open No. 08-324071 discloses a technique of analyzing information stored in a reception buffer and if information to restart the power supply to each unit of the main body is stored as a result of the analysis, restarting power supply. Further, Japanese Patent Laid-Open No. 08-324071 mentions even a technique of, when it is determined that information stored in the reception buffer has exceeded a predetermined amount, analyzing the information in the reception buffer, and if information to restart power supply to each unit of the main body is stored, restarting power supply.

In the technique disclosed in Japanese Patent Laid-Open No. 08-324071, data to be transmitted from the host apparatus to the printing apparatus contains print data and data which need not be printed. The data which need not be printed includes, for example, data about print settings and the like, data about the status of the printing apparatus, and a transmission request to obtain print information about management of the printing history.

When the printing apparatus receives data about print settings and the like, the print settings and the like need not be reflected in the printing apparatus immediately after reception, and suffice to be reflected in next printing execution. To the contrary, when the printing apparatus receives a transmission request from the host apparatus, it needs to respond to the host apparatus within a predetermined period. To respond to a status transmission request from the host apparatus, the printing apparatus obtains a status after the start of power supply to necessary functional blocks. To respond to a print information transmission request from the host apparatus, the printing apparatus obtains print information after the start of power supply to a storage unit which holds print information.

Thus, the technique disclosed in Japanese Patent Laid-Open No. 08-324071 significantly reduces power consumption effect when the printing apparatus receives data about print settings and the like which do not require the immediacy of power supply to a functional block. However, when the printing apparatus receives a status transmission request/print information transmission request which requires the immediacy of power supply, the power consumption reduction effect becomes low. Especially, print information requires detailed printing history management necessary in calculation of the printing operation cost and the like. Information needs to be held as much as possible. In an HDD-equipped printing apparatus, print information is generally stored in the HDD.

The HDD requires high power consumption in spin-up, and frequent repetition of supply and stop of power to the HDD further degrades the power consumption reduction effect. This problem becomes particularly serious in a printing apparatus which is shared and used between a plurality of host apparatuses.

SUMMARY OF THE INVENTION

The present invention provides a technique of suppressing the activation frequency of an HDD from a state in which power supply to the HDD stops to reduce power consumption in an HDD-equipped printing apparatus.

According to a first aspect of the present invention there is provided a printing apparatus comprising: a printing unit configured to print on a printing medium based on print data received from at least one host apparatus; a first storage unit configured to store print information associated with a printing operation except for print data; a power supply unit configured to perform first control to supply power to the first storage unit and second control to stop power supply to the first storage unit; a second storage unit configured to receive power supply from the power supply unit regardless of the first control or the second control; a storage processing unit configured to store, in the second storage unit, the print information stored in the first storage unit when the printing apparatus changes from the first control to the second control; and a transmission unit configured to, when the printing apparatus receives a request from the host apparatus to obtain the print information after changing to the second control, transmit the print information stored in the second storage unit to the host apparatus which has transmitted the obtaining request.

According to a second aspect of the present invention there is provided a method of controlling a printing apparatus including a printing unit configured to print on a printing medium based on print data received from at least one host apparatus, a first storage unit configured to store print information associated with a printing operation except for print data, a power supply unit configured to perform first control to supply power to the first storage unit and second control to stop power supply to the first storage unit, and a second storage unit configured to receive power supply from the power supply unit regardless of the first control or the second control, comprising: storing, in the second storage unit, the print information stored in the first storage unit when the printing apparatus changes from the first control to the second control; and when the printing apparatus receives a request from the host apparatus to obtain the print information after changing to the second control, transmitting the print information stored in the second storage unit to the host apparatus which has transmitted the obtaining request.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a perspective view exemplifying the outer appearance of a printing apparatus according to an embodiment of the present invention;

FIG. 2 is a block diagram exemplifying a functional arrangement in a printing apparatus 10 shown in FIG. 1;

FIG. 13 is a flowchart exemplifying a processing sequence in a host apparatus 20 according to the third embodiment.

DESCRIPTION OF THE EMBODIMENTS

Figure 3:
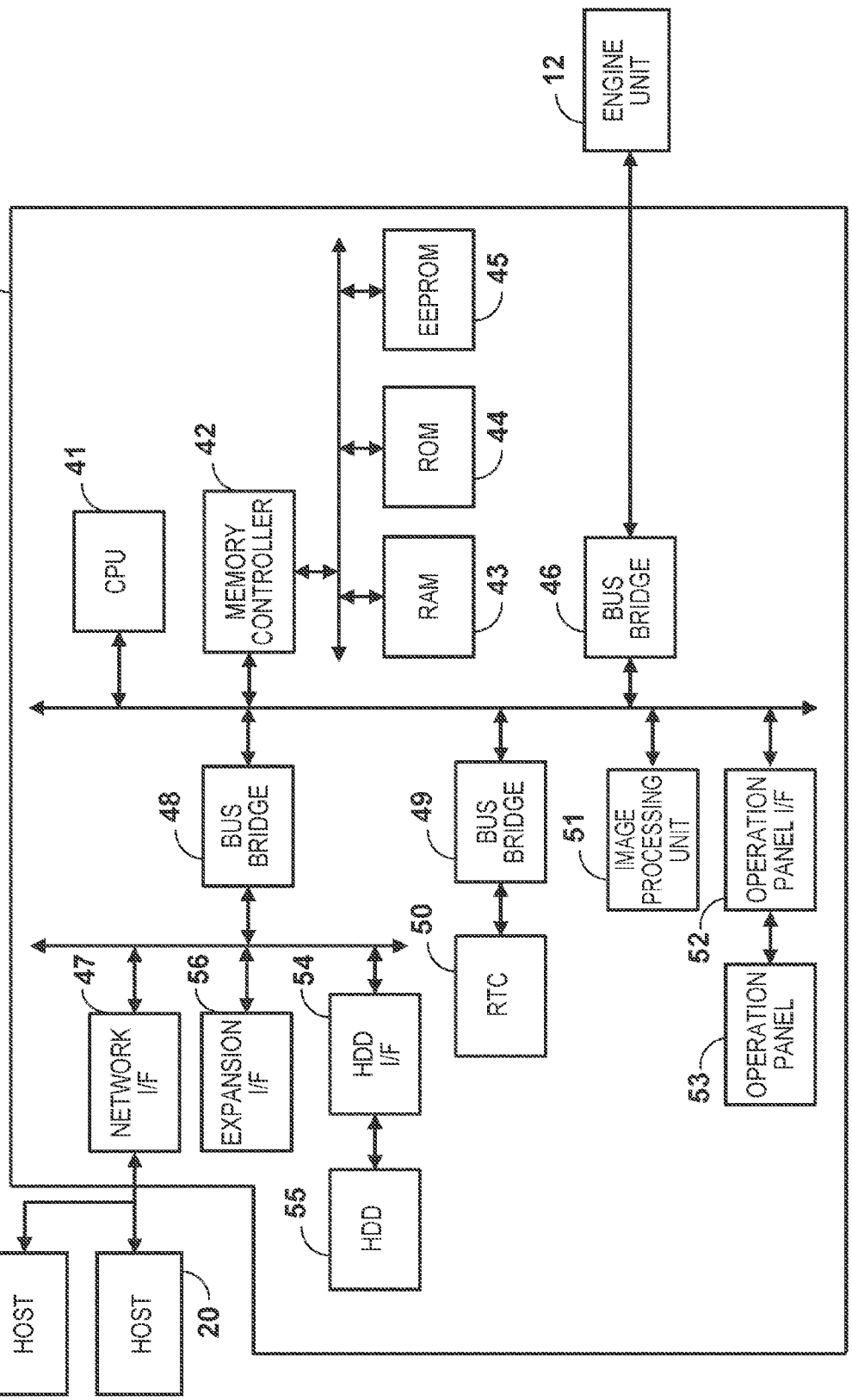
FIG. 3 is a block diagram exemplifying the hardware configuration of a controller unit 11 shown in FIG. 2.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that the following description will exemplify a printing apparatus which adopts an ink-jet printing system. The printing apparatus may be, for example, a single-function printer having only a printing function, or a multifunction printer having a plurality of functions including a printing function, FAX function, and scanner function. Also, the printing apparatus may be, for example, a manufacturing apparatus used to manufacture a color filter, electronic device, optical device, micro-structure, and the like using a predetermined printing system.

A "printing medium" means not only a paper sheet for use in a general printing apparatus but also a member which can fix ink, such as cloth, plastic film, metallic plate, glass, ceramics, resin, lumber, or leather in a broad sense.

First Embodiment

FIG. 1 is a perspective view exemplifying the outer appearance of a printing apparatus according to an embodiment of the present invention.

A printing apparatus 10 includes an inkjet printhead (not shown), and controls the printhead based on print data received from a host apparatus (not shown). More specifically, the printhead discharges ink from orifices formed in the printhead to a printing medium, thereby forming an image (including a character, sign, and the like) on the printing medium.

The printing apparatus 10 includes a recovery apparatus (not shown) configured to maintain and recover the ink discharge performance of the printhead. In the printing apparatus 10, every time a predetermined time has elapsed or when clogging of an orifice or the like occurs, the printhead moves to a position where it faces the recovery apparatus, and undergoes recovery processing. As the recovery processing, suction recovery, wiping (cleaning), preliminary discharge, and the like are executed.

Paper (to be also referred to as a sheet) serving as a printing medium used to print an image includes a cut sheet with a predetermined width and length (for example, A2 or A1 size), and a roll sheet which has a predetermined width and a length of, for example, several ten to several hundred meters and is rolled. Also, sheets of various materials are available, including paper, plastic sheet, photographic printing paper, cloth, and leather, as long as an image can be printed.

FIG. 2 is a block diagram exemplifying a functional arrangement in the printing apparatus 10 shown in FIG. 1.

A host apparatus 20 transmits print data and another data (for example, various control signals) to the printing apparatus 10. The printing apparatus 10 receives various data from one or a plurality of host apparatuses 20 via a network 30. Note that the host apparatus 20 and printing apparatus 10 need not always be connected by the network, and may be connected by a USB (Universal Serial Bus) or IEEE1394 bus or via a wire or wirelessly.

The host apparatus 20 incorporates a computer. The computer includes a main control unit such as a CPU, and storage units such as a ROM, RAM, and HDD. The computer further includes input/output units such as a keyboard, mouse, and display or touch panel, and a communication unit such as a network card. These building units are connected by a bus or the like, and controlled by executing a program stored in the storage unit by the main control unit.

The internal arrangement of the printing apparatus 10 is roughly divided into a controller unit 11 and engine unit 12.

The controller unit 11 comprehensively controls processes in the printing apparatus 10. More specifically, the controller unit 11 performs processes:
  control of an interface between the host apparatus 20 and the network 30 used for communication
  interpretation of a print control command transmitted from the host apparatus 20 and generation of image data
  image data compression/decompression processing
  various image processes in generation of image data
  transmission of a command to the engine unit 12 based on an operation by a user The engine unit 12 actually prints on a printing medium. The engine unit 12 prints based on image data generated by the controller unit 11.

More specifically, the engine unit 12 performs processes:
  generation of data which defines the discharge timing of the printhead
  print processing
  supply of ink to the printhead and recovery processing
  conveyance of a printing medium and control of a motor which operates the printhead The hardware configuration of the controller unit 11 shown in FIG. 2 will be exemplified with reference to FIG. 3.

The controller unit 11 includes a CPU (Central Processing Unit) 41, a memory controller 42, a RAM (Random Access Memory) 43, a ROM (Read Only Memory) 44, an EEPROM (Electrically Erasable Programmable ROM) 45, bus bridges 46, 48, and 49, a network I/F (InterFace) 47, an RTC (Real Time Clock) 50, and an image processing unit 51. In addition, the controller unit 11 includes an operation panel 53, operation panel I/F 52, HDD I/F 54, HDD (Hard Disk Drive) 55, and expansion I/F 56.

The ROM 44 stores control programs. The EEPROM 45 stores updatable control programs, processing programs, various constant data, and the like. The RAM 43 stores command signals and image information received from the host apparatus 20. The CPU 41 controls a printing operation based on pieces of information stored in these memories via the memory controller 42.

The operation panel 53 is formed from various buttons and a screen, and functions as a user interface. Various instructions from the user via the operation panel 53 are input as instruction information to the printing apparatus 10 via the operation panel I/F 52. The instruction information is transmitted to the CPU 41. The ON operation of the LED of the operation panel 53 and the display on the LCD are controlled based on instructions from the CPU 41.

The bus bridge 46 transmits image data to the engine unit 12. In addition, the bus bridge 46 transmits/receives various commands and status information between the controller unit 11 and the engine unit 12.

Various expansion cards are connected to the expansion I/F 56. The HDD I/F 54 is connected to the HDD 55. The HDD 55 stores print information about the printing history, print data, external characters, form images, emulation programs for interpreting print control languages of different language systems (PDL: Page Description Language), and the like.

The RTC 50 has a timepiece function, and holds the time using a battery (not shown) which is another system different from the power supply of the printing apparatus main body. The CPU 41 is connected to the RTC 50 via the bus bridge 49, and obtains time measured by the RTC 50.

The network I/F 47 transmits/receives data to/from one or a plurality of host apparatuses 20. The image processing unit 51 performs various image processes. For example, the image processing unit 51 converts raster data generated by the host apparatus 20 into image data (binary data of each ink color). The image data is output to the engine unit 12 via the bus bridge 46.

Figure 4:
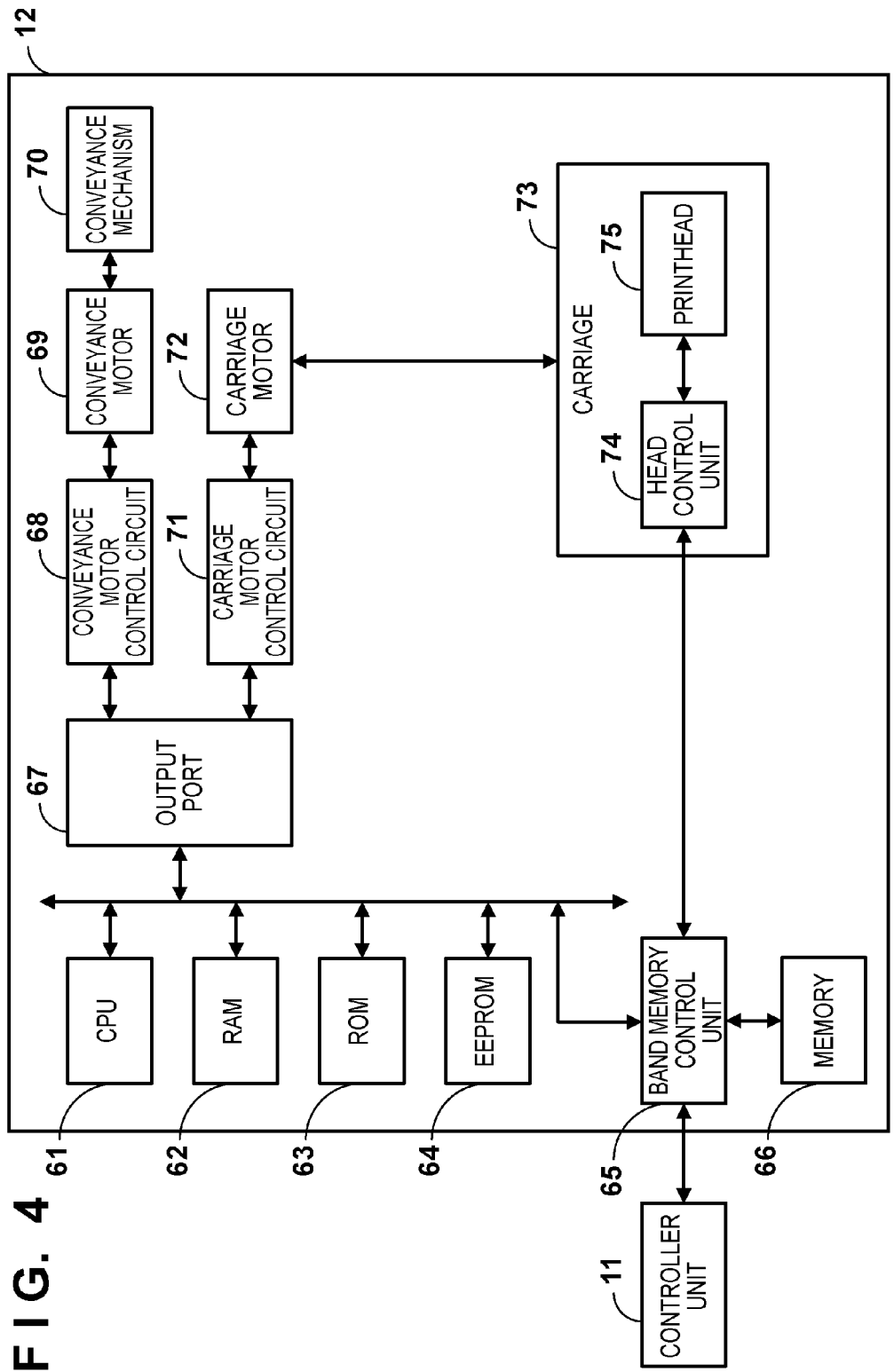
FIG. 4 is a block diagram exemplifying the hardware configuration of an engine unit 12 shown in FIG. 2.

The hardware configuration of the engine unit 12 shown in FIG. 2 will be explained with reference to FIG. 4.

The engine unit 12 includes a CPU 61, RAM 62, ROM 63, EEPROM 64, band memory control unit 65, memory 66, output port 67, conveyance motor control circuit 68, conveyance motor 69, and conveyance mechanism 70. In addition, the engine unit 12 includes a carriage motor control circuit 71, a carriage motor 72, and a carriage 73 including a head control unit 74 and printhead 75.

The engine unit 12 is connected to the controller unit 11 via the band memory control unit 65. The ROM 63 stores control programs. The EEPROM 64 stores updatable control programs, processing programs, various constant data, and the like. The RAM 62 stores command signals and image information received from the controller unit 11. The CPU 61 controls a printing operation based on pieces of information stored in these memories.

For example, the CPU 61 moves the carriage 73 by operating the carriage motor 72 via the output port 67 and conveyance motor control circuit 68. For example, the CPU 61 operates the conveyance mechanism 70 such as a conveyance roller by operating the conveyance motor 69 via the output port 67 and conveyance motor control circuit 68. Further, the CPU 61 drives the printhead 75 by controlling the band memory control unit 65 and head control unit 74 based on various kinds of information stored in the RAM 62. By this control, an image is formed on a printing medium.

Figure 5:
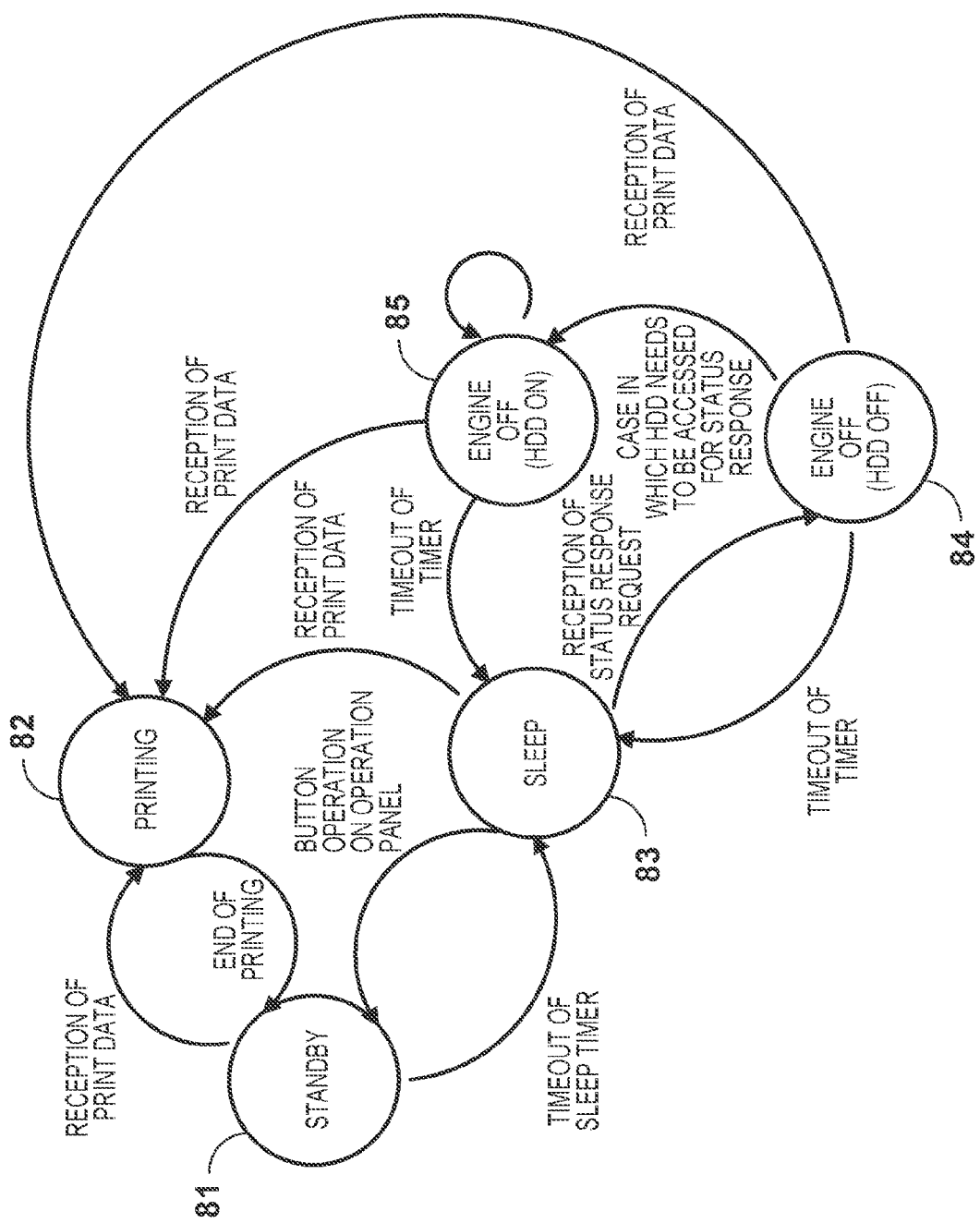
FIG. 5 is a view exemplifying power management control in the printing apparatus 10 shown in FIG. 1.

Power management control in the printing apparatus 10 shown in FIG. 1 will be explained with reference to FIG. 5.

The printing apparatus 10 according to the embodiment has five states: a standby state 81, printing state 82, sleep state 83, engine OFF (HDD OFF) state 84, and engine OFF (HDD ON) state 85. The standby state 81 is a normal standby state. The printing state 82 is a print processing execution state. The sleep state 83 is a so-called low power consumption mode. The engine OFF (HDD OFF) state 84 is a state in which power supply to the engine unit 12 and HDD 55 stops. The engine OFF (HDD ON) state 85 is a state in which power supply to the engine unit 12 stops but power is supplied to the HDD 55. Note that power consumption in the printing apparatus 10 is large in order of the printing state 82, standby state 81, engine OFF (HDD ON) state 85, engine OFF (HDD OFF) state 84, and sleep state 83.

When the user presses a power key on the operation panel 53 in the sleep (power-off) state 83, the printing apparatus 10 performs initialization processing and then changes (shifts) to the standby state 81. In the standby state 81, all functional arrangements in the printing apparatus 10 become active.

When the printing apparatus 10 receives print data from the host apparatus 20, it changes (shifts) to the printing state 82 and executes print processing. After the end of the print processing, the printing apparatus 10 returns again to the standby state 81.

In the standby state 81, the printing apparatus 10 can quickly execute transmission of a status in response to a request from the host apparatus 20, and transmission/reception of data other than print data to/from the host apparatus 20.

Further, in the standby state 81, the printing apparatus 10 operates a timer (sleep timer) to measure the time during which the standby state is maintained, without receiving print data. If the printing apparatus 10 determines based on the sleep timer that the time during which no print data has been received (no print processing has been done) has exceeded a preset time, it shifts to the sleep state 83 to reduce power consumption. At this time, the printing apparatus 10 copies, in the RAM 43 (or EEPROM 45), some pieces of print information (information about print data) stored in the HDD 55, and then shifts to the sleep state 83.

In the sleep state 83, the printing apparatus 10 stops power supply to the engine unit 12 to reduce power consumption. At this time, the CPU 41 is set in the halt state, the RAM 43 is set in the self-refresh state, and even power supply to the HDD 55 stops. As for the remaining building units, power supply stops, and the operation clock rate decreases.

In this case, the network I/F 47 is set so that it can detect reception of data from the host apparatus 20 even when the CPU 41 is in the halt state. For example, if the network I/F 47 and bus bridge 48 are connected by a PCI bus, the network I/F 47 is set to D3hot. With this setting, the halt state of the CPU 41 can be canceled using a PME signal when the network I/F 47 detects that data has been received from the host apparatus 20.

When the printing apparatus 10 receives print data from the host apparatus 20 in the sleep state 83, all functional arrangements in the printing apparatus 10 become active. More specifically, the printing apparatus 10 shifts to the printing state 82 and executes print processing.

Also when the user operates the operation panel 53 while the printing apparatus 10 is in the sleep state 83, all functional arrangements in the printing apparatus 10 become active. More specifically, the printing apparatus 10 shifts to the standby state 81 and accepts the panel operation from the user.

When the printing apparatus 10 receives data (for example, a status response request or print information transmission request) other than print data from the host apparatus 20 in the sleep state 83, it shifts to the engine OFF (HDD OFF) state 84. In the engine OFF (HDD OFF) state, power supply to the engine unit 12 is kept off, but the printing apparatus 10 sets the CPU 41, RAM 43, and the like to a normal operation state to transmit/receive data to/from the host apparatus 20. These settings include even a setting of supplying power to the CPU 41 and RAM 43. At this time, power supply to the HDD 55 stops.

After setting the CPU 41, RAM 43, and the like to a normal operation state, the CPU 41 in the printing apparatus 10 determines whether the HDD 55 needs to be accessed along with transmission/reception of data to/from the host apparatus 20. If the CPU 41 determines that the HDD 55 need not be accessed, the printing apparatus 10 directly responds to a request from the host apparatus 20. If the CPU 41 determines that the HDD 55 needs to be accessed, the printing apparatus 10 shifts to the engine OFF (HDD ON) state 85, supplies power to the HDD 55, obtains necessary information from the HDD 55, and then responds to a request from the host apparatus 20.

In the engine OFF (HDD OFF) state 84 and engine OFF (HDD ON) state 85, the timer runs to measure the time elapsed after the completion of transmitting/receiving data to/from the host apparatus 20. If a timeout of the timer occurs, the printing apparatus 10 shifts to the sleep state 83. When the printing apparatus 10 receives print data from the host apparatus 20 in the engine OFF (HDD OFF) state 84 or engine OFF (HDD ON) state 85, it shifts to the printing state 82 and executes print processing.

Figure 6:
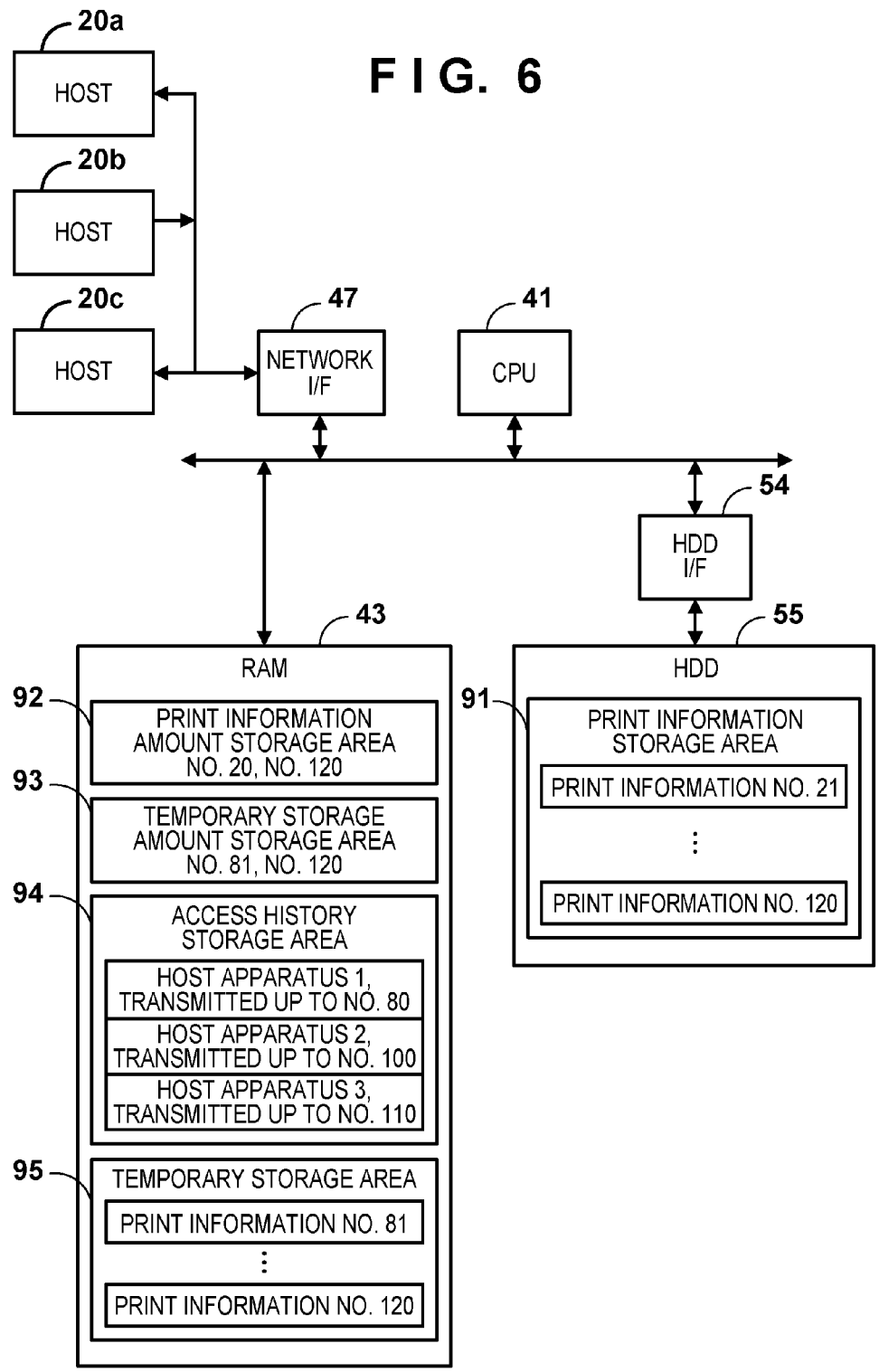
FIG. 6 is a block diagram exemplifying print information.

Print information stored in the HDD 55 and RAM 43 (or EEPROM 45) of the controller unit 11 shown in FIG. 3 will be exemplified with reference to FIG. 6.

The HDD 55 has a print information storage area 91 where print information is stored. The print information is information used for calculation of the printing cost, the charge of the printing apparatus, and the like. After performing print processing (printing operation) based on print data, the printing apparatus 10 generates print information and stores it in the HDD 55.

The print information includes, for example, at least one of the owner name (host apparatus which has transmitted print data), printing result, paper type, printing paper use amount, ink use amount, printing start time, and time taken to print. In the embodiment, the print information storage area 91 can store 100 print data. If the number of print data exceeds 100, the oldest information is discarded and new information is stored. To achieve this, the printing apparatus 10 generates identification information for every print information. The printing apparatus 10 manages print information using the identification information. In this embodiment, the identification information is a number (for example, No. 21). In the example of FIG. 6, identification information (number) is assigned in an order in which print data has been accepted. Since the number of print information has reached 120, print information No. 1 to print information No. 20 are discarded from the print information storage area 91, and print information No. 21 to print information No. 120 are stored.

The RAM 43 has a print information amount storage area 92, temporary storage amount storage area 93, access history storage area 94, and temporary storage area 95. After transmitting print information to the host apparatus, the printing apparatus 10 generates access history information (transmission history information) and stores it in the RAM 43. The printing apparatus 10 stores access history information in the RAM 43 for each host apparatus which transmits a print information obtaining request.

The print information amount storage area 92 stores information indicating identification information (number) of the oldest print information and that of the latest print information among pieces of print information stored in the print information storage area 91. In the example of FIG. 6, No. 21 and No. 120 are stored. The temporary storage amount storage area 93 stores information indicating the identification information (number) of the oldest print information and that of the latest print information among pieces of print information stored in the temporary storage area 95. In the example of FIG. 6, No. 81 and No. 120 are stored.

The access history storage area 94 stores information (access history information) indicating the number of the latest print information among pieces of print information transmitted to the host apparatus 20 in response to a request from the host apparatus 20. In other words, the access history storage area 94 stores identification information of the final print information among transmitted pieces of print information. After transmitting print information the printing apparatus 10 updates identification information stored in the access history storage area 94. This information is stored for each (destination) host apparatus. Note that the host apparatus can be identified using an IP address, computer name, or the like. In the example of FIG. 6, pieces of print information up to No. 80 have been transmitted to a host apparatus 20a, pieces of print information up to No. 100 have been transmitted to a host apparatus 20b, and pieces of print information up to No. 110 have been transmitted to a host apparatus 20c.

The temporary storage area (print information storage area) 95 is used to temporarily store some pieces of print information stored in the print information storage area 91 when the printing apparatus 10 shifts from the standby state 81 to the sleep state 83. The printing apparatus 10 reads out print information from the HDD 55 based on identification information stored in the access history storage area 94, and stores it in the temporary storage area (print information storage area) 95.

Figure 7:
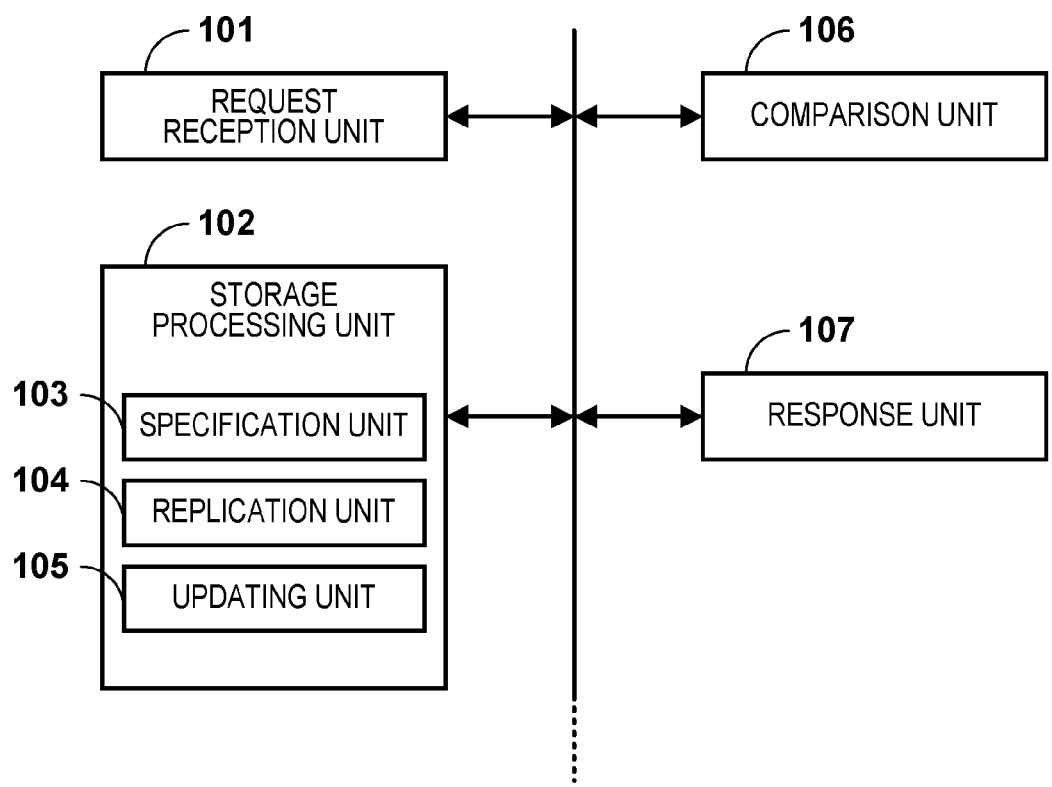
FIG. 7 is a block diagram exemplifying the functional arrangement of the controller unit 11 shown in FIG. 3.

A functional arrangement in the controller unit 11 shown in FIG. 3 will be exemplified with reference to FIG. 7. Note that the arrangement shown in FIG. 7 is implemented by, for example, executing a control program stored in the ROM 44 or the like by the CPU 41. Needless to say, part or all of the arrangement shown in FIG. 7 may be implemented by a dedicated hardware circuit.

As a functional arrangement, the controller unit 11 includes a request reception unit 101, storage processing unit 102, comparison unit 106, and response unit 107.

The request reception unit 101 receives data (for example, a status response request and print information transmission request) other than print data from the host apparatus 20.

In a shift from the standby state 81 to the sleep state 83, the storage processing unit 102 stores some pieces of of print information in the HDD 55 to the memory (RAM 43 or EEPROM 45). As a functional arrangement, the storage processing unit 102 includes a specification unit 103, replication unit 104, and updating unit 105.

The specification unit 103 specifies a host apparatus 20 having the largest number of print information for which no transmission request has been received, among pieces of print information stored in the print information storage area 91 of the HDD 55. More specifically, the specification unit 103 specifies a host apparatus 20 having the largest number of print information which has not been obtained. This specification is done using information stored in the print information amount storage area 92 and access history storage area 94.

The replication unit 104 obtains, from the HDD 55, print information corresponding to the host apparatus specified by the specification unit 103 (print information not transmitted to the specified host apparatus), and copies the obtained print information in the RAM 43. The updating unit 105 updates various kinds of information stored in the RAM 43. For example, the updating unit 105 updates the access history stored in the access history storage area 94 of the RAM 43.

Upon receiving a print information transmission request from the host apparatus 20, the comparison unit 106 compares the requested print information with print information stored in the RAM 43. Based on the result of comparison by the comparison unit 106, the response unit 107 transmits a response to the requesting (print information transmission request source) host apparatus 20.

Figure 8:
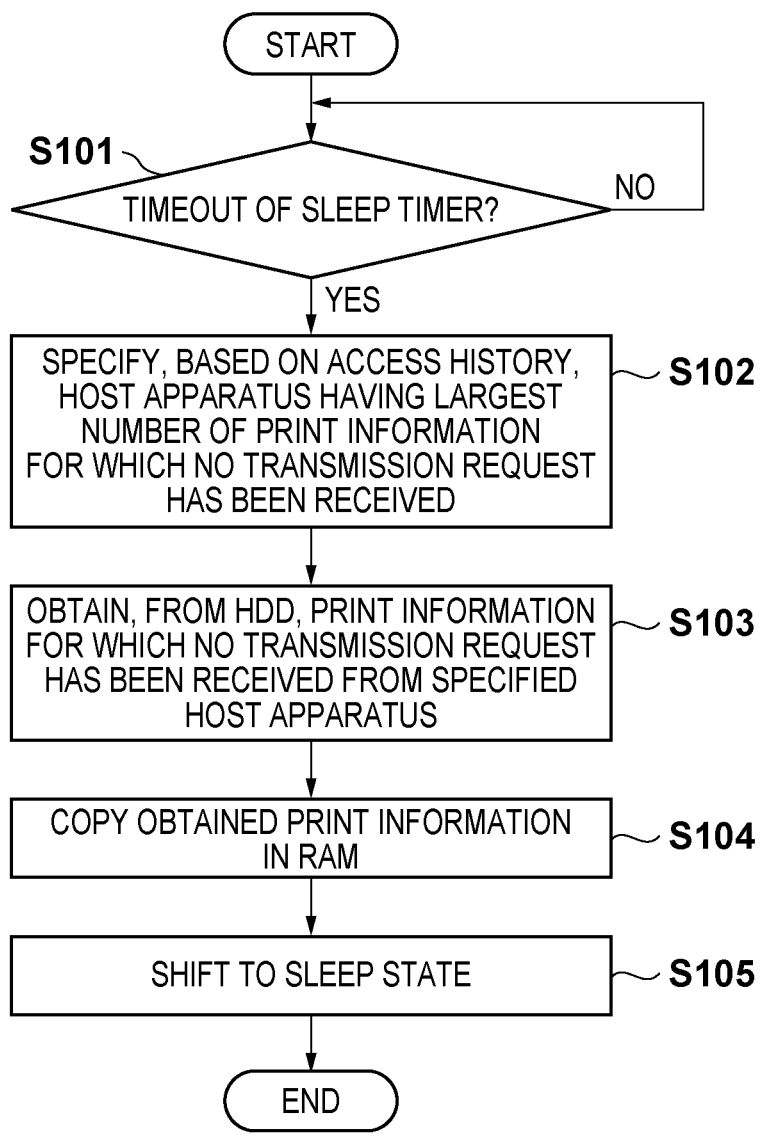
FIG. 8 is a flowchart exemplifying a processing sequence in the printing apparatus 10 shown in FIG. 1.
Figure 9:
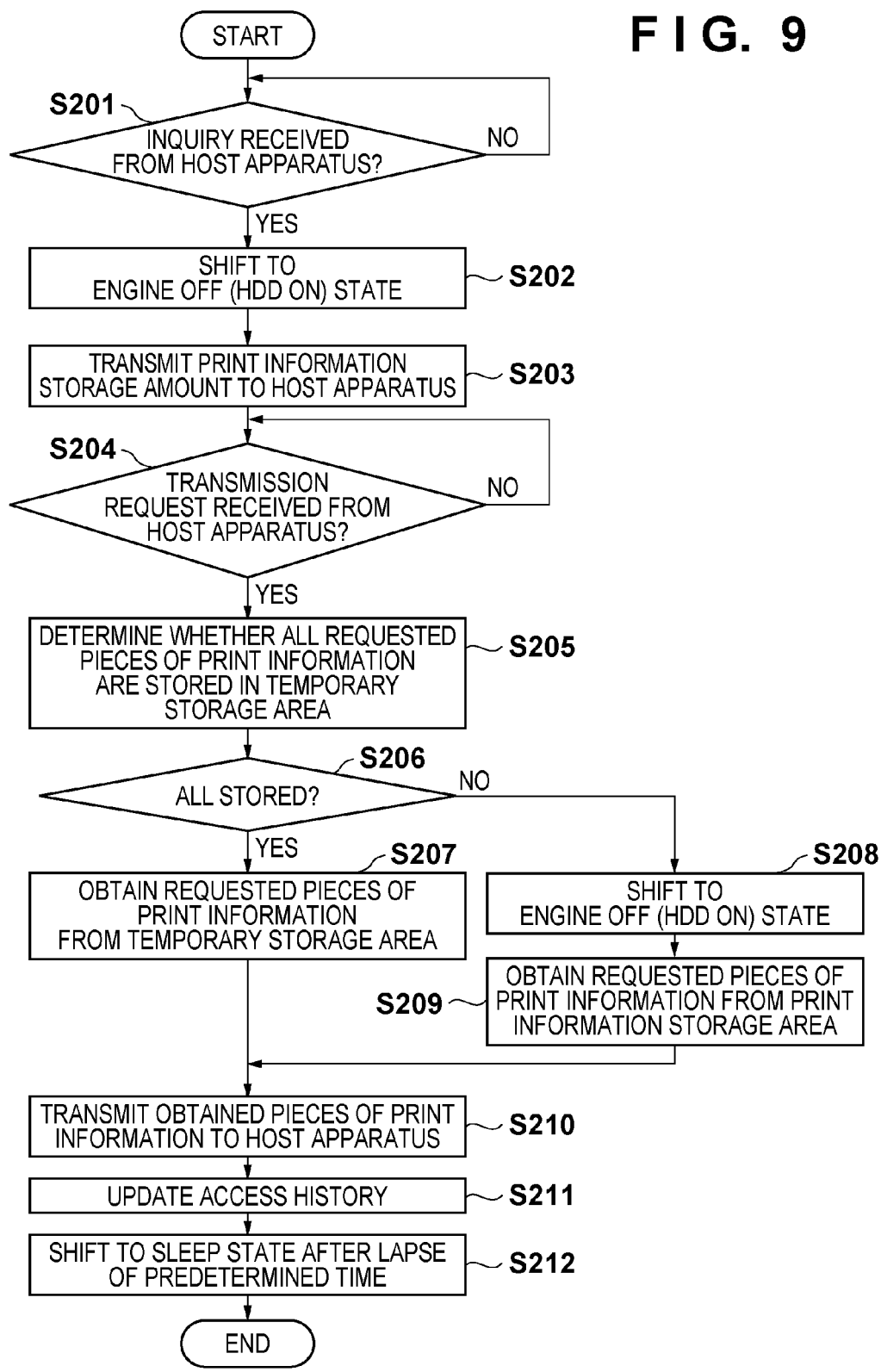
FIG. 9 is a flowchart exemplifying a processing sequence in the printing apparatus 10 shown in FIG. 1.

Processing sequences in the printing apparatus 10 shown in FIG. 1 will be exemplified with reference to FIGS. 8 and 9.

First, an operation when the printing apparatus 10 shifts from the standby state 81 to the sleep state 83 will be explained with reference to FIG. 8.

At this time, the printing apparatus 10 is in the standby state 81. In this state, assume that no print data has been received for a predetermined time and a timeout of the sleep timer occurs (YES in step S101). Then, the specification unit 103 in the printing apparatus 10 specifies a host apparatus 20 having the largest number of print information for which no transmission request has been received, among pieces of print information stored in the print information storage area 91 of the HDD 55 (step S102). As described above, a host apparatus is specified using information stored in the print information amount storage area 92 and access history storage area 94. In the example of FIG. 6, pieces of information stored in the print information amount storage area 92 reveal that pieces of print information stored in the print information storage area 91 are No. 21 to No. 120. Also, the access history storage area 94 reveals that pieces of information up to print information No. 80 have been transmitted to the host apparatus 20a. From this, pieces of print information for which no transmission request has been received are No. 81 to No. 120. Further, pieces of print information for which no transmission request has been received from the host apparatuses 20b and 20c are No. 101 to No. 120 and No. 111 to No. 120, respectively. Hence, the host apparatus 20a can be specified as a host apparatus having the largest number of print information for which no transmission request has been received.

The replication unit 104 in the printing apparatus 10 obtains, from the print information storage area 91 of the HDD 55, pieces of print information for which no transmission request has been received from the specified host apparatus (step S103). The replication unit 104 copies the obtained pieces of print information in the temporary storage area 95 ensured in the RAM 43 (step S104). In the example of FIG. 6, the host apparatus 20a is specified in the processing of step S102, and pieces of print information for which no transmission request has been received from the host apparatus 20a are No. 81 to No. 120. Thus, print information No. 81 to print information No. 120 are copied in the temporary storage area 95, out of pieces of print information stored in the print information storage area 91. At this time, the replication unit 104 in the printing apparatus 10 stores, in the temporary storage amount storage area 93, information indicating the copied pieces of print information. In the example of FIG. 6, pieces of information stored in the temporary storage amount storage area 93 are No. 81 and No. 120. Upon completion of copying, the printing apparatus 10 shifts to the sleep state 83 (step S105).

Next, an operation when the printing apparatus 10 receives a print information transmission request from the host apparatus 20 in the sleep state will be explained with reference to FIG. 9.

Prior to transmitting a print information transmission request to the printing apparatus 10, the host apparatus 20 confirms the storage amount of print information held in the printing apparatus 10. At this time, the host apparatus 20 inquires the print information storage amount of the printing apparatus 10. If the printing apparatus 10 receives this inquiry (YES in step S201), it shifts from the sleep state 83 to the engine OFF (HDD OFF) state 84 in order to respond to the host apparatus 20 (step S202). Upon completion of shifting to the engine OFF (HDD OFF) state 84, the replication unit 104 in the printing apparatus 10 obtains information stored in the print information amount storage area 92, and the response unit 107 transmits the print information storage amount to the host apparatus 20 (step S203).

The host apparatus 20 compares the already received print information with the print information transmitted from the printing apparatus 10. If new print information to be obtained is stored in the printing apparatus 10, the host apparatus 20 transmits a print information transmission request to the printing apparatus 10. Note that this transmission request contains information capable of specifying requested print information.

If the printing apparatus 10 receives the transmission request from the host apparatus 20 (YES in step S204), the comparison unit 106 in the printing apparatus 10 determines whether all requested pieces of print information are stored in the temporary storage area 95 of the RAM 43 (step S205). If the comparison unit 106 determines that all requested pieces of print information are stored in the temporary storage area 95 of the RAM 43 (YES in step S206), the printing apparatus 10 obtains the requested pieces of print information from the temporary storage area 95 of the RAM 43.

If the comparison unit 106 determines that even some requested pieces of print information are not stored in the temporary storage area 95 of the RAM 43 (NO in step S206), the printing apparatus 10 shifts to the engine OFF (HDD ON) state 85 (step S208). Then, the replication unit 104 obtains pieces of print information from the print information storage area 91 of the HDD 55 (step S209).

After obtaining the pieces of print information requested by the host apparatus 20, the response unit 107 in the printing apparatus 10 transmits the obtained pieces of print information to the host apparatus 20 (step S210). The updating unit 105 updates information stored in the access history storage area 94 (step S211). After that, if a predetermined time has elapsed and a timeout of the timer occurs, the printing apparatus 10 shifts to the sleep state 83 (step S212).

As described above, according to the first embodiment, the RAM 43 stores information capable of specifying pieces of print information transmitted to the host apparatus 20. This allows specifying pieces of print information not transmitted to the host apparatus 20 out of pieces of print information stored in the HDD 55. In a shift to the sleep state, pieces of print information not transmitted to the specified host apparatus are copied from the HDD 55 to the RAM 43.

By this operation, when the printing apparatus 10 receives a print information transmission request from the host apparatus 20 in the sleep state, the HDD 55 need not always be activated, suppressing the activation frequency of the HDD 55. Therefore, power consumption upon activation of the HDD 55 can be suppressed, the activation frequency of the HDD 55 can be decreased, and the product life of the HDD 55 can be prolonged.

Second Embodiment

The second embodiment will be described. The first embodiment does not consider the capacity of the RAM 43 in particular. The second embodiment will explain a case in which no sufficient capacity can be assigned to a temporary storage area 95 of a RAM 43.

The arrangement and overall processing sequence of a printing apparatus 10 according to the second embodiment are the same as those in the first embodiment, and a description thereof will not be repeated. Here, a difference from the first embodiment will be mainly explained. The second embodiment is different from the first embodiment in a functional arrangement in a controller unit 11 shown in FIG. 7 and processing in a shift from a standby state 81 to a sleep state 83 shown in FIG. 8.

Figure 10:
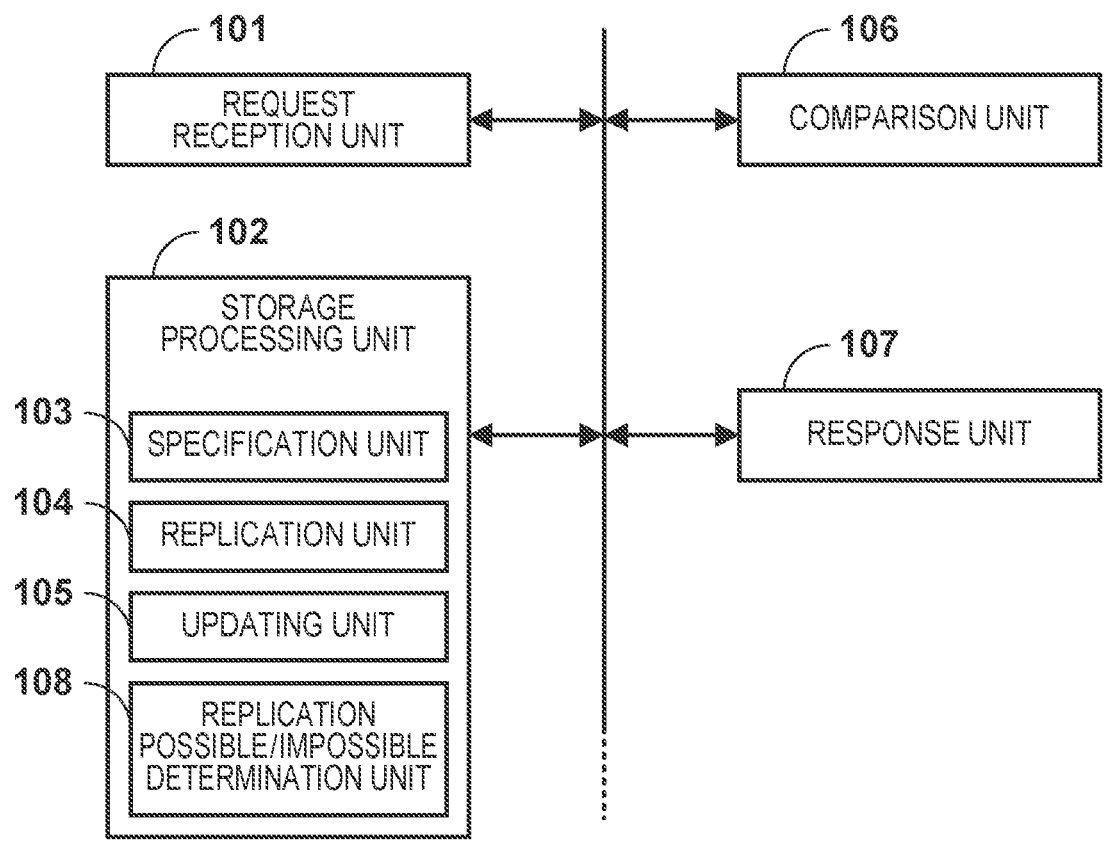
FIG. 10 is a block diagram exemplifying the functional arrangement of a controller unit 11 according to the second embodiment.

A functional arrangement in the controller unit 11 according to the second embodiment will be exemplified with reference to FIG. 10. Note that the same reference numerals as those in FIG. 7 denote the same functions, and a description thereof will be sometimes omitted.

The controller unit 11 according to the second embodiment includes a replication possible/impossible determination unit 108, in addition to the arrangement of the first embodiment.

The replication possible/impossible determination unit 108 determines whether print information to be stored in the RAM 43 (print information not transmitted to a specified host apparatus) can be copied in the temporary storage area 95 ensured in the RAM 43. A storage processing unit 102 performs print information copy processing based on the result of determination by the replication possible/impossible determination unit 108.

Figure 11:
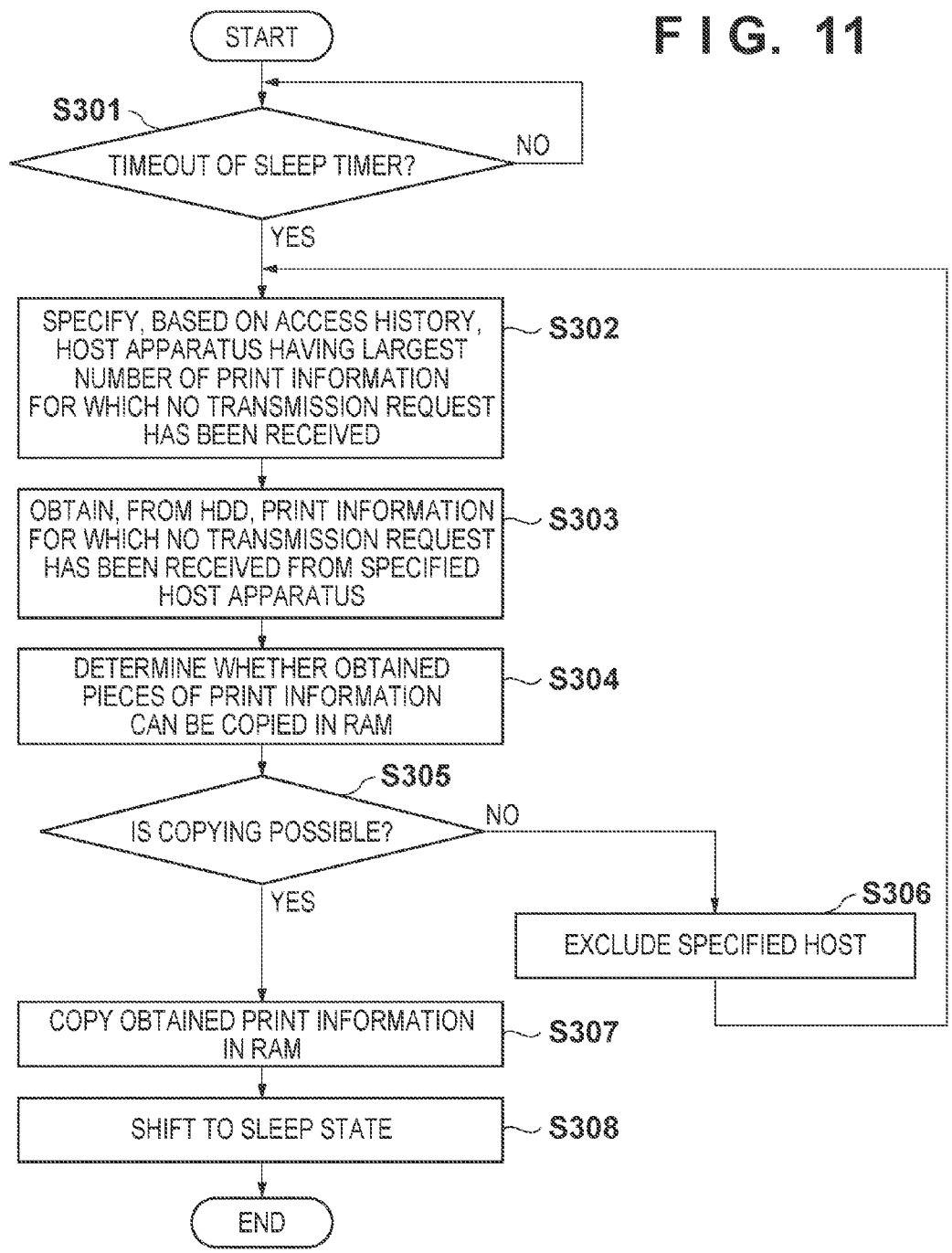
FIG. 11 is a flowchart exemplifying a processing sequence in a printing apparatus 10 according to the second embodiment.

An operation when the printing apparatus 10 shifts from the standby state 81 to the sleep state 83 according to the second embodiment will be explained with reference to FIG. 11.

At this time, the printing apparatus 10 is in the standby state 81. In this state, assume that no print data has been received for a predetermined time and a timeout of the sleep timer occurs (YES in step S301). Then, a specification unit 103 in the printing apparatus 10 specifies a host apparatus 20 having the largest number of print information for which no transmission request has been received, among pieces of print information stored in a print information storage area 91 of an HDD 55 (step S302). In the example of FIG. 6, a host apparatus 20a is specified in the same way as in the first embodiment.

Then, a replication unit 104 in the printing apparatus 10 obtains, from the print information storage area 91 of the HDD 55, pieces of print information for which no transmission request has been received from the specified host apparatus (step S303). The replication possible/impossible determination unit 108 determines whether the obtained pieces of print information can be copied in the temporary storage area 95 ensured in the RAM 43 (step S304). Assume that the temporary storage area 95 of the RAM 43 according to the second embodiment can store 30 pieces of print information. In this case, if the number of print information not transmitted to the specified host apparatus 20a is equal to or smaller than 30, the replication possible/impossible determination unit 108 determines that copying is possible; otherwise, determines that copying is impossible.

If the replication possible/impossible determination unit 108 determines that copying is impossible (NO in step S305), the printing apparatus 10 excludes the specified host apparatus (step S306), and performs again the above-described processes in step S302 and S303. More specifically, the printing apparatus 10 specifies a host apparatus having the second largest number of print information for which no transmission request has been received. In the example of FIG. 6, a host apparatus 20b is specified. Then, the replication possible/impossible determination unit 108 in the printing apparatus 10 determines whether pieces of print information for which no transmission request has been received from the host apparatus specified again can be copied in the temporary storage area 95 (step S304). In the example of FIG. 6, the number of print information for which no transmission request has been received from the host apparatus 20b is 20, and it is determined that copying is possible.

If the replication possible/impossible determination unit 108 determines in step S304 that copying is possible (YES in step S305), the replication unit 104 in the printing apparatus 10 copies corresponding pieces of print information in the temporary storage area 95 ensured in the RAM 43 (step S307). Since the host apparatus 20b is specified, pieces of print information for which no transmission request has been received from the host apparatus 20b are No. 101 to No. 120. Thus, print information No. 101 to print information No. 120 are copied in the temporary storage area 95, out of pieces of print information stored in the print information storage area 91. At this time, the printing apparatus 10 stores, in a temporary storage amount storage area 93, information indicating the copied pieces of print information. In this case, pieces of information stored in the temporary storage amount storage area 93 are No. 101 and No. 120. Upon completion of copying, the printing apparatus 10 shifts to the sleep state 83 (step S308).

As described above, according to the second embodiment, when copying print information to the temporary storage area 95 of the RAM 43, it is determined whether the print information can be copied. If copying is impossible, a host apparatus having the second largest number of print information for which no transmission request has been received is specified. In a shift to the sleep state, pieces of print information not transmitted to the specified host apparatus are copied from the HDD 55 to the RAM 43. Hence, even when a predetermined area (temporary storage area 95) in the RAM 43 does not have a sufficient free space, the activation frequency of the HDD 55 can be suppressed, similar to the first embodiment.

Third Embodiment

The third embodiment will be described. In the first embodiment, if even some pieces of print information for which a print information transmission request has been received are not stored in the RAM 43, the printing apparatus 10 shifts to the engine OFF (HDD ON) state. To the contrary, the third embodiment will explain a case in which an HDD 55 is not quickly activated even in this case.

The arrangement and overall processing sequence of a printing apparatus 10 according to the third embodiment are the same as those in the first embodiment, and a description thereof will not be repeated. Here, a difference from the first embodiment will be mainly explained. The third embodiment is different from the first embodiment in processing when the printing apparatus 10 receives a print information transmission request from a host apparatus 20 in the sleep state.

Figure 12:
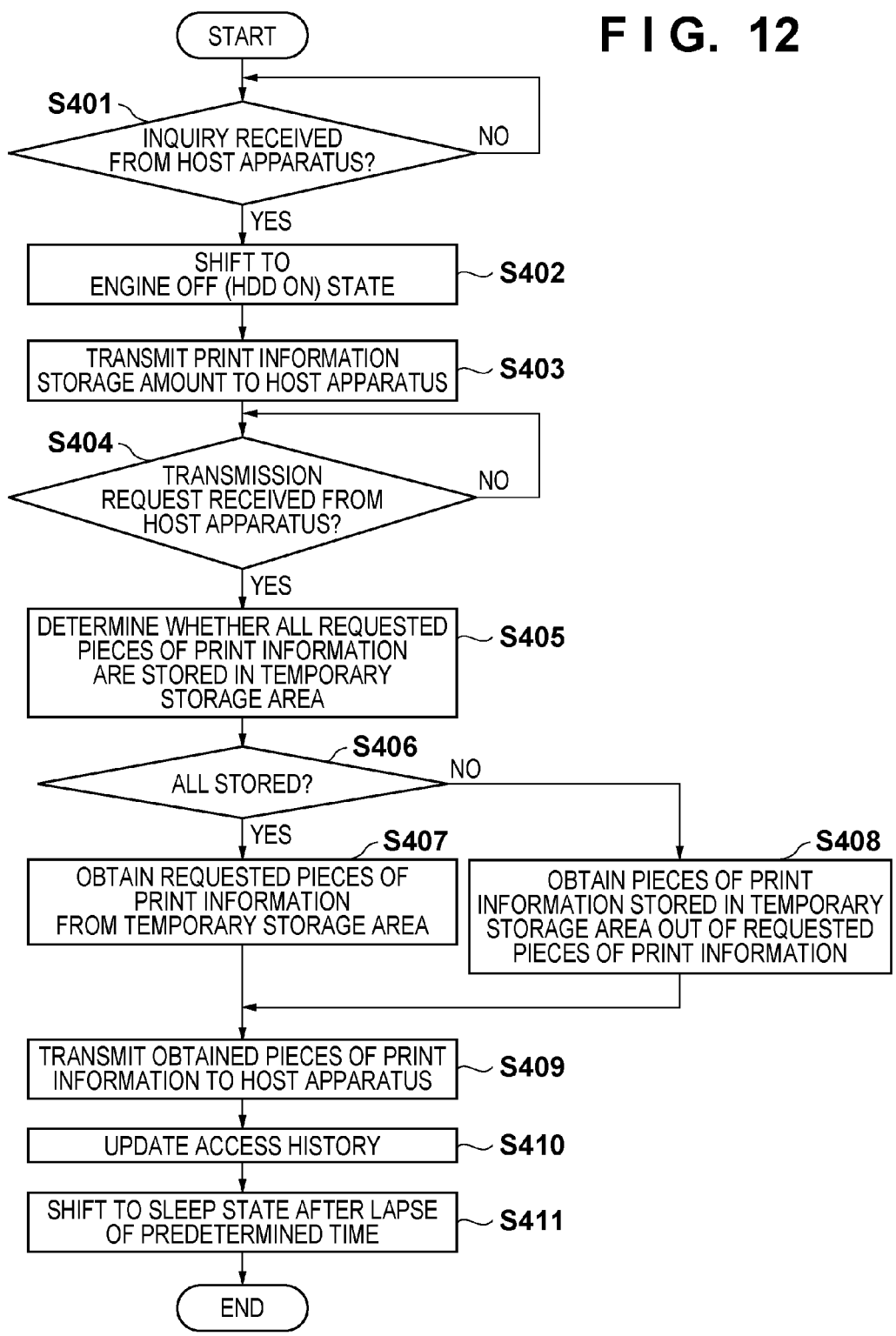
FIG. 12 is a flowchart exemplifying a processing sequence in a printing apparatus 10 according to the third embodiment.

An operation when the printing apparatus 10 receives a print information transmission request from the host apparatus 20 in the sleep state according to the third embodiment will be explained with reference to FIG. 12.

In this processing, first, the printing apparatus 10 performs the same processes as those in steps S201 to S205 of FIG. 9 described in the first embodiment (steps S401 to S405). If all pieces of print information requested by the host apparatus 20 are stored in a temporary storage area 95 of a RAM 43 (YES in step S406), a replication unit 104 in the printing apparatus 10 obtains the requested pieces of print information from the temporary storage area 95 of the RAM 43 (step S407). Then, the printing apparatus 10 performs the same processes as those in steps S210 to S212 of FIG. 9 described in the first embodiment (steps S409 to S411).

If not all pieces of print information requested by the host apparatus 20 are stored in the temporary storage area 95 of the RAM 43 (NO in step S406), the replication unit 104 in the printing apparatus 10 obtains pieces of print information stored in the temporary storage area 95 of the RAM 43 (step S408). That is, some pieces of print information requested by the host apparatus 20 are obtained. A response unit 107 in the printing apparatus 10 transmits the obtained pieces of print information to the host apparatus 20 (step S409). Then, the printing apparatus 10 performs the same processes as those in steps S211 and S212 of FIG. 9 described in the first embodiment (steps S410 and S411).

An example will be described with reference to FIG. 6. Assume that the temporary storage area 95 of the RAM 43 according to the third embodiment can store 30 pieces of print information. Thus, assume that print information No. 101 to print information No. 120 are stored in the temporary storage area 95 of the RAM 43.

In this state, a host apparatus 20a has obtained pieces of print information up to No. 80, and requests the printing apparatus 10 to transmit print information No. 81 to print information No. 120. However, only print information No. 101 to print information No. 120 are stored in the temporary storage area 95 of the RAM 43. Therefore, the printing apparatus 10 obtains print information No. 101 to print information No. 120 and transmits them to the host apparatus 20a. As a result, the host apparatus 20a obtains pieces of print information up to No. 81 and pieces of print information No. 101 to No. 120, and the serial numbers of the obtained pieces of print information become discontinuous.

A processing sequence in the host apparatus 20 will be exemplified with reference to FIG. 13. In this case, a processing sequence on the host apparatus side when the serial numbers of obtained pieces of print information become discontinuous will be explained.

To periodically obtain print information from the printing apparatus 10, if the polling interval has elapsed (YES in step S501), the host apparatus 20 transmits a print information storage amount transmission request to the printing apparatus 10 (step S502). If the host apparatus 20 receives a print information storage amount (YES in step S503), it determines whether print information has been updated from previous print information reception (step S504).

If the host apparatus 20 determines that no print information has been updated, that is, the print information amount remains unchanged (NO in step S505), it returns again to the processing of step S501. If the print information amount has increased (YES in step S505), the host apparatus 20 transmits a request to the printing apparatus 10 to transmit print information which has not been obtained previously (step S506).

If the host apparatus 20 receives, from the printing apparatus 10, print information which has not been obtained previously (YES in step S507), it transmits a transmission request again to obtain the latest print information from the printing apparatus 10 (step S508). If the host apparatus 20 receives corresponding print information (YES in step S509), the process ends.

As described above, according to the third embodiment, when the printing apparatus 10 receives, in the sleep state, a request to transmit pieces of print information containing those not stored in the temporary storage area 95 of the RAM 43, it transmits only those stored in the temporary storage area 95 to the host apparatus. After return to the standby state, the printing apparatus 10 transmits the remaining pieces of print information to the host apparatus. The third embodiment can suppress the activation frequency of the HDD 55 much more than in the first embodiment.

Typical embodiments of the present invention have been described. However, the present invention is not limited to the above-described and illustrated embodiments, and can be properly modified and practiced within the gist of the invention.

For example, in the above-described embodiments, the above-described processing (processing of copying print information from the HDD 55 to the RAM 43) is executed in a shift from the standby state to the sleep state. However, the present invention is not limited to this. It suffices to perform this processing when the HDD changes from the ON state (first operation state) to the OFF state (second operation state). For example, the above-described processing is performed in a shift from the engine OFF (HDD ON) state to the engine OFF (HDD OFF) state. Alternatively, the above-described processing is performed in a shift from the engine OFF (HDD ON) state to the sleep state.

The above-described embodiments have exemplified an inkjet printing apparatus. However, the present invention is not limited to this and is applicable to a printing apparatus of any printing method such as an electrophotographic printing apparatus as long as the printing apparatus includes an HDD.

As described above, the present invention can suppress the activation frequency of the HDD from a state in which power supply to the HDD stops to reduce power consumption in an HDD-equipped printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283725, filed Dec. 20, 2010, which is hereby incorporated by reference herein in its entirety.

What is claimed is:

1. A printing apparatus comprising:
   a printing unit configured to print on a printing medium based on print data received from at least one host apparatus;
   a first storage unit configured to store print information associated with a printing operation;
   a power supply unit configured to perform first control to supply power to the first storage unit and second control to stop power supply to the first storage unit;
   a second storage unit configured to receive power supply from the power supply unit regardless of the first control or the second control;
   a management unit configured to manage transmission history information, indicating printing information which has been sent from the printing apparatus to the at least one host apparatus;
   a specification unit configured to specify, based on the transmission history information, at least part of the print information stored in the first storage unit, which has not been transmitted to the at least one host apparatus;
   a storage processing unit configured to store, in the second storage unit, the at least part of the print information specified by the specification unit when the printing apparatus changes from the first control to the second control; and a transmission unit configured to, when the printing apparatus receives a request from a host apparatus to obtain the at least part of the print information after changing to the second control, transmit the at least part of the print information stored in the second storage unit to the host apparatus which has transmitted the obtaining request.

2. The apparatus according to claim 1, wherein after performing a printing operation based on print data, the printing apparatus generates the print information containing identification information and stores the print information in the first storage unit.

3. The apparatus according to claim 1, wherein the printing apparatus generates the transmission history information for each host apparatus which transmits an obtaining request, and stores the transmission history information in the second storage unit.

4. The apparatus according to claim 3, wherein the transmission history information contains identification information of print information which has been transmitted finally out of transmitted pieces of print information.

5. The apparatus according to claim 3, wherein the storage processing unit stores the at least part of the print information in the second storage unit based on the transmission history information.

6. The apparatus according to claim 1, wherein the print information is information used to calculate a charge of the printing apparatus.

7. The apparatus according to claim 1, wherein the print information includes at least one of a host apparatus name, ink use amount, printing medium type, printing medium use amount, printing start time, printing end time, and time taken to print.

8. The apparatus according to claim 1, wherein the first storage unit is a hard disk drive.

9. The apparatus according to claim 1, wherein
in a case where an amount of printing information which has not been sent to a first host apparatus is larger than an amount of printing information which has not been sent to a second host apparatus, the specification unit specifies, based on the transmission history information, the larger printing information which has not been sent to the first host apparatus.

10. A method of controlling a printing apparatus including a printing unit configured to print on a printing medium based on print data received from at least one host apparatus, a first storage unit configured to store print information associated with a printing operation, a power supply unit configured to perform first control to supply power to the first storage unit and second control to stop power supply to the first storage unit, a second storage unit configured to receive power supply from the power supply unit regardless of the first control or the second control, and a management unit configured to manage transmission history information, indicating printing information which has been sent from the printing apparatus to the at least one host apparatus, the method comprising:
specifying, based on the transmission history information, at least part of the print information stored in the first storage unit, which has not been transmitted to the at least one host apparatus;

storing, in the second storage unit, the at least part of the print information specified in the specifying when the printing apparatus changes from the first control to the second control; and when the printing apparatus receives a request from a host apparatus to obtain the print information after changing to the second control, transmitting the at least part of the print information stored in the second storage unit to the host apparatus which has transmitted the obtaining request.

11. The method according to claim 10, wherein
in the specifying, in a case where an amount of printing information which has not been sent to a first host apparatus is larger than an amount of printing information which has not been sent to a second host apparatus, the larger printing information which has not been sent to the first host apparatus is specified based on the transmission history information.

\* \* \* \* \*